United States Patent [19]

Hashimoto et al.

[11] 4,042,812
[45] Aug. 16, 1977

[54] PULSE DISTRIBUTION METHOD AND APPARATUS

[75] Inventors: Yoshihiro Hashimoto, Hachioji; Shinichi Isobe, Tachikawa, both of Japan

[73] Assignee: Fujitsu Fanuc Limited, Tokyo, Japan

[21] Appl. No.: 618,762

[22] Filed: Oct. 2, 1975

[30] Foreign Application Priority Data

Oct. 12, 1974   Japan .............................. 49-117435

[51] Int. Cl.² ............................................ G05B 19/18
[52] U.S. Cl. ................................. 235/151.11; 318/569
[58] Field of Search .............. 235/150.3, 151.11, 152; 318/569-574, 685; 444/1

[56] References Cited

U.S. PATENT DOCUMENTS

| | | | |
|---|---|---|---|
| 3,256,424 | 6/1966 | Gotz ................... | 235/152 IE |
| 3,325,630 | 6/1967 | Murakami ............... | 235/151.11 |
| 3,416,056 | 12/1968 | Motooka et al. ........ | 318/573 |
| 3,576,981 | 5/1971 | Okamoto et al. ......... | 235/152 IE |
| 3,609,323 | 9/1971 | McDaniel ............... | 235/151.11 I |
| 3,703,327 | 11/1972 | Pomella et al. ......... | 235/151.11 |
| 3,842,330 | 10/1974 | Kolell ................. | 235/151.11 |
| 3,864,557 | 2/1975 | Sindelar ............... | 318/571 |
| 3,889,238 | 6/1975 | Sakurai ................ | 318/569 |

Primary Examiner—Malcolm A. Morrison
Assistant Examiner—Errol A. Krass
Attorney, Agent, or Firm—Staas & Halsey

[57] ABSTRACT

The present invention discloses a method and apparatus for distributing command pulses to a numerically controlled machine which is provided with a first and a second control axis having different resolution. The first control axis has a smaller resolution than the second control axis. The numerical datum for each control axis, based on the smaller resolution are given to the pulse distributing circuit. When the command pulse obtained by the pulse distributing operation is supplied to the first control axis, the movable part of the machine is displaced by an amount corresponding to the smaller resolution. At this time, the distributing point is also moved by the same amount in the first axis direction. When the command pulse is supplied to the second control axis, the movable part of the machine is displaced by an amount which is a multiple of the smaller resolution by the ratio of the resolutions of the two control axes, and the distributing point is also moved by the same amount in the second axis direction.

13 Claims, 10 Drawing Figures

PULSE DISTRIBUTION METHOD AND APPARATUS

The present invention relates to a method and apparatus for suitably distributing command pulses to a numerically controlled apparatus which is used for a machine tool.

In a conventional numerical control apparatus for continuously controlling a machine tool which has a plural number of control axes, the resolutions of each control axis, that is, the amounts of movement of the movable part in each axial direction caused by one pulse, have the same value. For example, when a bit of a machine tool is controlled, the resolution, that is, the amount of movement per one command pulse, is selected as 0.01 mm for both control axes.

However, in some mechanical tools, such as a lathe, it is preferable to provide different resolutions for two control axes. That is, for the purpose of realizing high speed finishing with high precision, the resolution for the control axis which feeds the cutting tool in the radial direction, requires high accuracy, for example, 0.005 mm/pulse, and the resolution for the control axis which provides longitudinal movement of the cutting tool, requires a larger value, for example, 0.01 mm/pulse.

The object of the present invention is to provide a method and apparatus for distributing command pulses which are supplied to the machine tool having different resolutions with respect to two control axes and simplifying the numerical control of the apparatus.

For achieving the above-mentioned object, this invention provides a pulse distribution method and apparatus for a numerically controlled machine which is provided with a first and a second control axis having different resolutions from each other. Said method calls for sending one pulse to said first or second control axis in accordance with whether a distributing point of the pulse distributing operation is above or below a locus to be followed so that said distributing point is moved to a new point and, then, said method calls for determining whether one pulse is supplid to said first and second control axis in accordance with whether said new distributing point is above or below said locus. The method comprises converting command data for said second control axis into a value in accordance with the resolution of said first control axis, which has a smaller resolution than said second axis; shifting the distributing point by the smaller resolution when one pulse is supplied to said first control axis; and, when said one pulse is supplied to said second control axis, shifting said distributing point by a resolution which is a multiple of said smaller resolution by the ratio of the resolution of said first and second axes.

Further features and advantages of the present invention will be apparent from the ensuing description with reference to the accompanying drawings to which, however, the scope of the invention is in no way limited.

Figure 1:
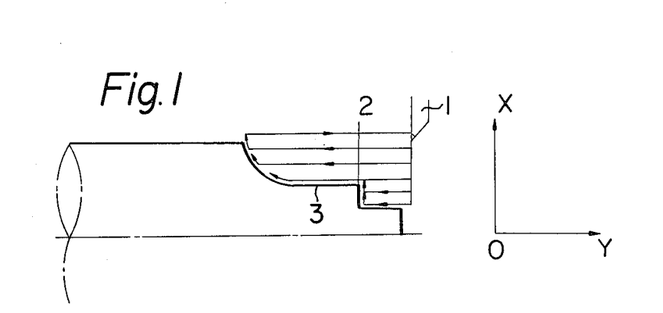
FIG. 1 is a brief diagram which shows a relation between two resolutions, that is, the longitudinal movement of the cutting tool and the transverse movement of the cuttting tool with respect to a piece of work.

Referring to FIG. 1, a piece of work 2 is finished by feeding the cutting tool 1 in the directions indicated by the arrows, and by rotating the work 2, so that a final desired form 3 is obtained. Now, for high precision cutting, it is required that the advancing amount per one pulse of the cutting tool in a radial direction (X-axis direction) be smaller than the feeding amount per one pulse of the cutting tool in the horizontal direction (Y-axis direction). On the other hand, when the cutting operation has to be carried out at high speed, the horizontal feeding space should be increased. Therefore, if the advancing amount of the cutting tool in the radial direction is a small value,, for example, 0.0005 mm/pulse, the feeding amount of the cutting tool in the axial direction is for example, 0.01 mm/pulse.

Figure 2:
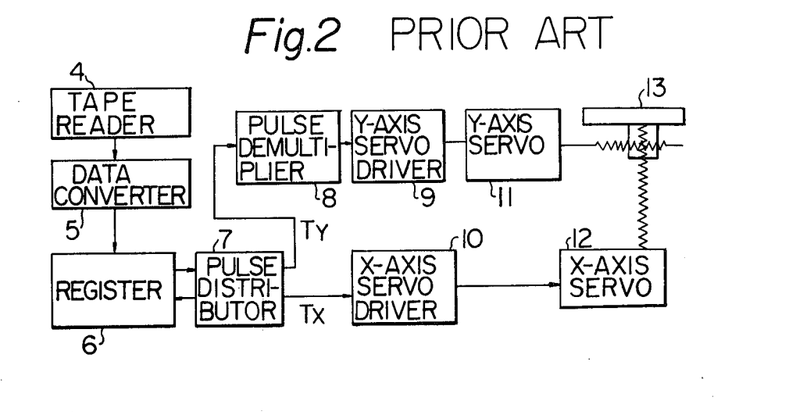
FIG. 2 is a block diagram of an apparatus which is used for realizing a conventional pulse distribution method.

For the purpose of satisfying the above-mentioned requirement, the following pulse distribution method has previously been proposed for numerically controlling the machine tool. FIG. 2 is a block diagram of the carrying out of the above-mentioned pulse distribution method. Referring to FIG. 2, reference numeral 4 is a tape reader, 5 is a data converter for the input data, 6 is a register for storing the numerical values of the input data, 7 is a pulse distribution circuit, 8 is an output pulse demultiplier, 9 is a Y axis servo driving circuit, 10 is an X axis servo driving circuit, 11 is a Y axis servo, 12 is an X axis servo, 13 is the machine tool and TX, TY are output terminals of the pulse distribution circuit 7.

In the block diagram shown in FIG. 2, the data converter circuit 5 multiplies, by a constant ratio, the numerical data indicated by the punched tape in the tape reader 4 and sends the multiplied numerical data to the register 6. The pulse distribution circuit 7 generates, at the terminals TX and TY, the desired distribution pulses which are distributed in accordance with the numerical data in the numerical register 6. The output pulse demultiplier 8 demultiplies the output pulses which appear at the output terminal TY by a ratio which is the ratio of X and Y resolutions and sends the demultiplied pulse to the Y axis servo drive circuit 9.

Figure 3:
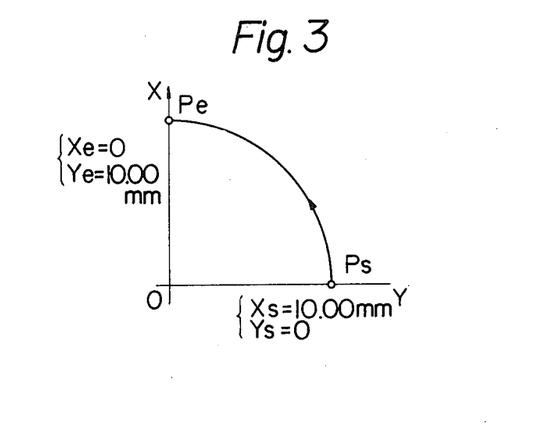
FIG. 3 is a diagram which shows a start point and an end point, and a locus between them, of the pulse distribution method according to FIG. 2.

Next, the concept of circular interpolation, where the pulses are distributed along a circular profile, as shown in FIG. 3, will be explained with reference to FIG. 2. The numerical data which are read out from the punched tape by the tape reader 1 are the starting point data (Xs = 10.00 mm Ys = 0) and the end point data (Xe = 0, Ye = 10.00 mm). These data stored in the numerical register 6 in accordance with the resolutions of the two axes. When the resolution of the X-axis and the resolution of the Y-axis are equal, for example 0.01 mm/pulse, and the input data are stored in the numerical register 6 and the pulse distributor circuit 7 sends pulses based on the stored numerical values to the X and Y axis servo driving circuits 9 and 10. This feature is shown in item A in Table I.

When the two resolutions are not equal, for example, the resolution of the X-axis is 0.005 mm/pulse and the resolution of the Y-axis is 0.01 mm/pulse, the data converter 5 converts the input data to the number of the pulses based on the smaller resolution and the register 6 stores these converted values. Next, puse distribution is carried out in the pulse distribution circuit 7 using the content of the numerical register 6. The pulses which are generated in the Y-axis direction are demultiplied by the pulse demultiplier circuit 8 and sent to the servo driver circuit 9. In this example, the pulse demultiplier circuit 8 is a so-called one-half frequency divider circuit, which divides the number of input pulses into half. This feature is shown in item B of Table I.

Table I

|  | A. The resolution of the X axis is equal to that of the Y axis | | B. The resolution of the X axis is not equal to that of the Y axis | |
|---|---|---|---|---|
|  | X axis | Y axis | X axis | Y axis |
| Input data (Numerical value) | 1000 | 1000 | 1000 | 1000 |
| Factor of conversion circuit (Numerical value) |  |  | 2 times | 2 times |
| Numerical value register (Numerical value) | 1000 | 1000 | 2000 | 2000 |
| Pulse Distributor output (Number of pulses) | 1000 | 1000 | 2000 | 2000 |
| Pulse demultiplier (Function) |  |  | 1/1 times | 1/2 times |
| Output pulse (Number of pulses) | 1000 | 1000 | 2000 | 1000 |
| Displacement (mm) | 1000 | 1000 | 1000 | 1000 |

When the machine tool is controlled according to the above-mentioned method, the cutting speed can be increased, with many advantageous effects, without reducing the finishing accuracy. However, the apparatus which realizes the above-mentioned method must utilize the input data conversion circuit 5 and the output pulse demultiplier circuit 8, so that the apparatus shown in FIG. 2 becomes very complicated. Further, a large number of pulses is required, and the calculation speed cannot be increased.

In the present invention, the problem of the difference between the resolution of X-axis and the resolution of Y-axis is solved by modifying a discrimination equation in the pulse distributing operation which is disclosed by the specifications of U.S. Pat. No. 3,416,056, so that the output pulse demultiplier circuit 8 shown in FIG. 2 can be removed. Further, the input data converter 2 shown in FIG. 2 can also be eliminated, because the discrimination equation is modified based upon the weight of the input data. In addition, the speed of pulse distribution is increased, because the number of distributing pulses can be decreased.

Next, an explanation concerning the principle of the method according to the present invention will be presented. We assume that the ratio of X axis resolution and Y axis resolution is 1:2. In this case, the weight of the numerical value of the X axis in the register in the pulse distribution circuit is taken as a reference.

A. Linear interpolation

Figure 4:
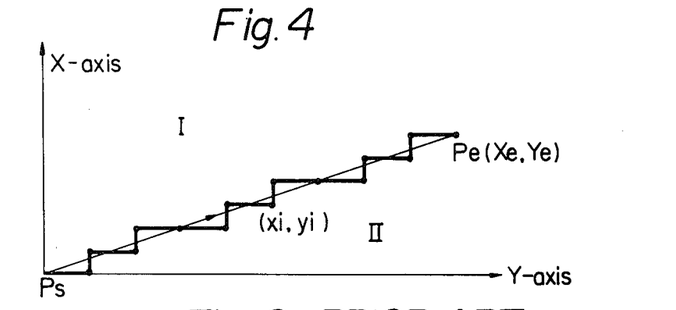
FIG. 4 is a diagram which shows a principle of one embodiment of the pulse distribution method according to the present invention.

When the end point $Pe$ (FIG. 4) is shown as $(Xe, Ye)$ and the present point P is shown as $(x_i, y_j)$, the discrimination point is positioned at an upper part (region I) or a lower part (region II) is as follows:

$$H_{ij} = X_e Y_j - Y_e X_i$$

When $H_{ij} \leq 0$, the distributing point $P(x_i, Y_j)$ is in the region I and the following algebraic operation is carried out:

$$Y_j + 2 = Y_{j+1}$$

(wherein $Y_o = 0$)

$$H_{i, j+1} = H_{i,j} + 2X_e$$

(where $H_{oo} = 0$)
And if $Y_j \neq Y_e$, one pulse is sent out to the Y axis.

When $H_{ij} > 0$, that is, the distributing point $P(x_i, y_j)$ is in the region II, which is lower than the linear line $P_s - P_e$, the following calculation is carried out:

$$x_i + 1 = x_{i+1}$$

(where $X_o = 0$)

$$H_{i+1,j} = H_{ij} - Y_e$$

And is $x_i \neq X_e$, one pulse is sent out to the X axis.

Figure 5:
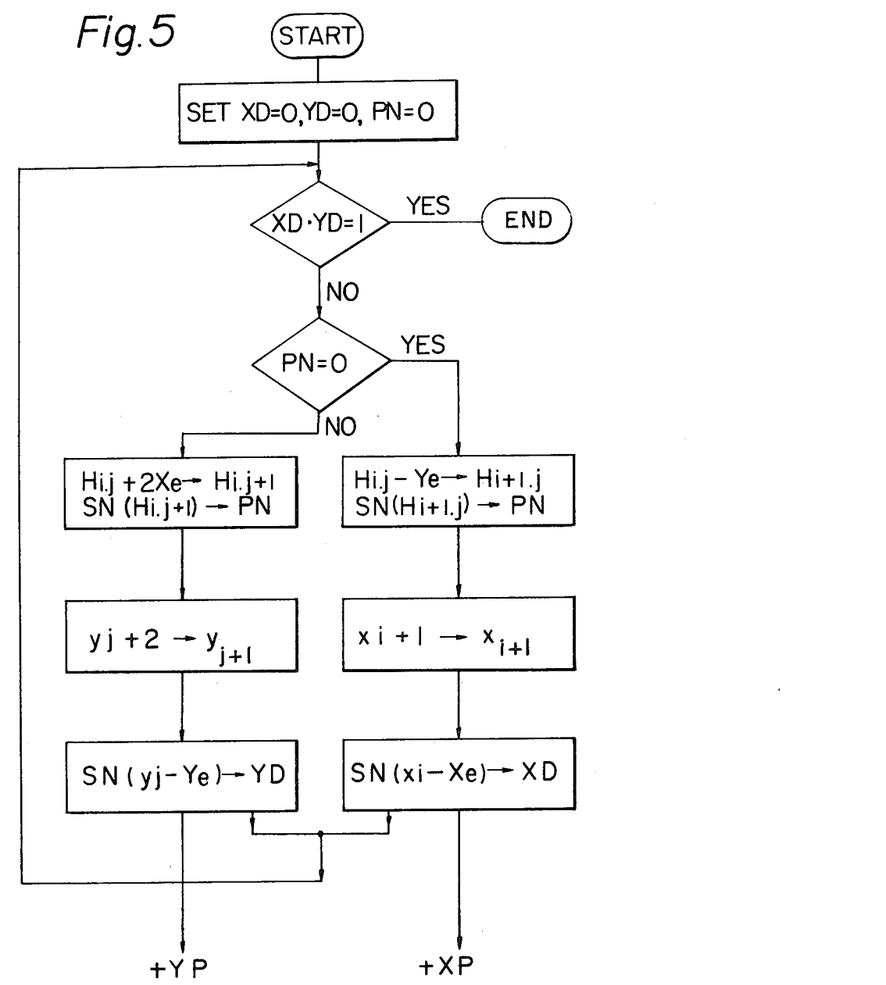
FIG. 5 is a flow chart for realizing the method shown in FIG. 4.
Figure 6:
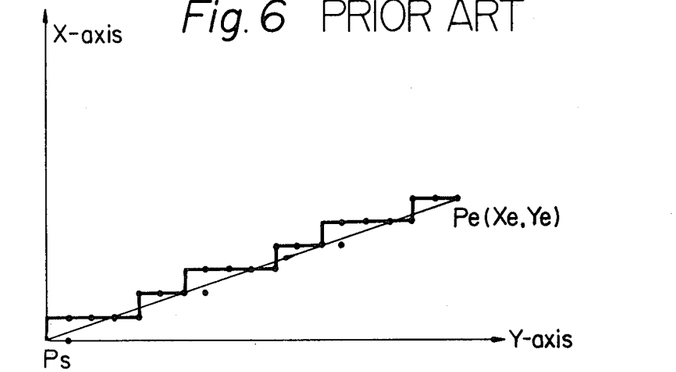
FIG. 6 is a diagram which shows a principle of a conventional pulse distribution method.

When $x_i$ reaches $X_e$, and $y_j$ reaches $Y_e$, the distribution of the pulses is finished. As mentioned above, when $H_{ij}$ is "0" or positive, the calculation with respect to the Y axis is followed, and when $H_{ij}$ is negative, the calculation with respect to the X axis is followed. FIG. 5 shows a flow-chart for carrying out the interpolation of the linear line. According to the present invention, the cutting tool can reach the position $P_e$ by fifteen calculations for distributing the pulses. FIG. 6 shows a movement of the cutting tool according to the prior art, which requires twenty-four operations for distributing the pulses.

B. Circular interpolation

Figure 7:
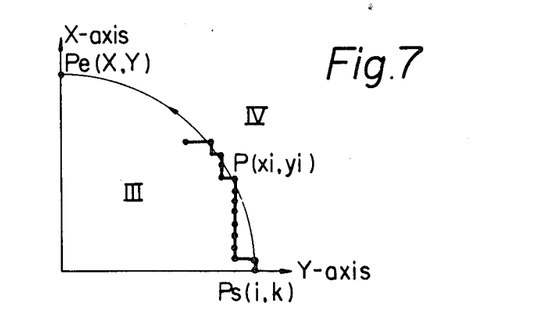
FIG. 7 is a diagram which shows a principle of another embodiment of the pulse distribution method according to the present invention.

We assume that the distributing point $P(x_i, y_j)$ is positioned in a first quadrant and the pulses are distributed along the circular profile in the direction of the arrow thereof (See FIG. 7). In this case, the discrimination equation for the algebraic operation is as follows:

$$H_{ij} = x_i^2 + y_j^2 - R^2$$

When $H_{ij} > 0$, that is, the distributing point P is in the region IV, the following algebraic operation takes place.

$$Y_j - 2 = Y_{j+1}$$

(Where $Y_o$ is a coordinate of the start point $P_s$.)

$$H_{i,j+1} = H_{ij} - 4Y_j + 4$$

(where $H_{oo} = 0$)
And if $y_j \neq Y_e$, one pulse is sent out to the Y axis driver circuit.

When $H_{ij} \leq 0$, that is, the distributing point P, is in the region III, the following algebraic operation takes place:

$$x_1 + 1 = x_{i+l}$$

(where $x_o$ is a coordinate of the start point $p_s$).

$$H_{i+1,j} = H_{i,j} = 2x_i + 1$$

And, if $x_i = X_e$, one pulse is sent out to the X axis driver.

When $x_1$ reaches $X_e$, and $Y_j$ reaches $Y_e$ the distribution of the pulse is finished.

Figure 8:
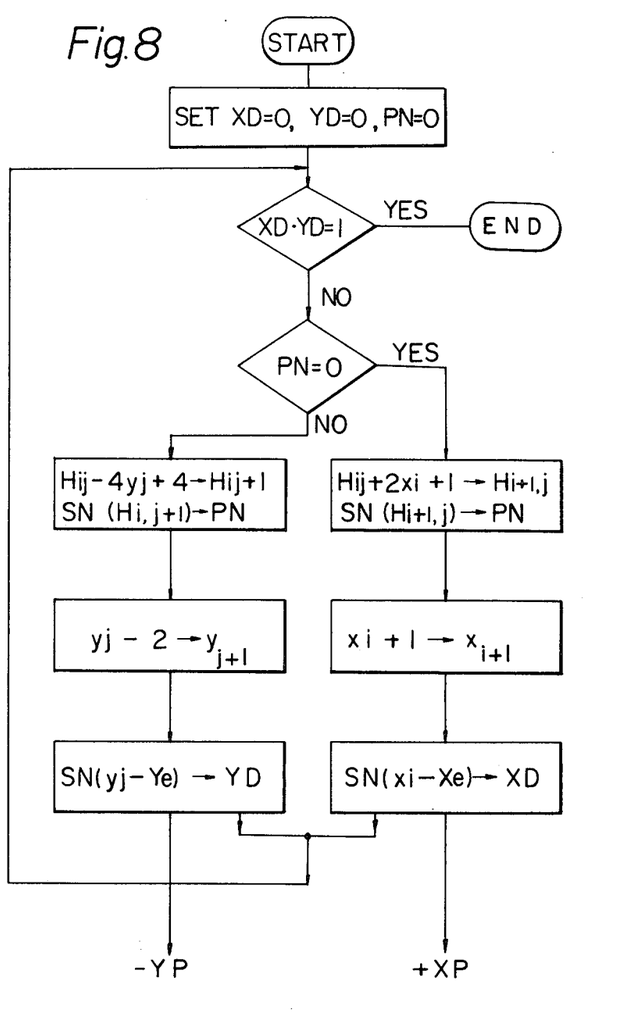
FIG. 8 is a flow chart for realizing the method shown in FIG. 7.

As mentioned above, when $H_{i,j}$ is "0" or negative, the operation with respect to the X axis is followed, and when $H_{i,j}$ is positive, the operation with respect to the Y axis is followed. FIG. 8 is a flow chart for carrying out the interpolation along a circular profile as described above.

As is clear from the above explanation, when a ratio of resolutions for said axes is m:n, the general algebraic operation is carried out in the following manner.

(i) With respect to X axis.
 a. For linear interpolation, the operation is:

$$H_{i+1,j} = H_{i,j} - m \cdot Y_e, \text{ then,}$$

$$x_{i+1} = x_i + m$$

For circular interpolation, the operation is:

$$H_{i+1,j} = H_{ij} + 2 \cdot i \cdot m \cdot X_e + m^2, \text{ then,}$$

$$x_{i+1} = x_i + m.$$

ii. With respect to Y axis.
 a. For linear interpolation, the operation is:

$$H_{j+1} = H_{ij} + n \cdot X_e, \text{ then,}$$

$$Y_{j+1} = Y_j + n.$$

b. For circular interpolation, the operation is:

$$H_{i,j+1} = H_{ij} - 2 \cdot n \cdot y_j + n^2, \text{ then,}$$

$$y_{j+1} = y_j + n.$$

As mentioned above, the pulse distribution circuit carries out the algebraic operation of the discrimination equation, which is formed based upon the difference between the resolutions, so that the numeral control can be carried out without providing the output pulse demultiplier circuit.

Figure 9:
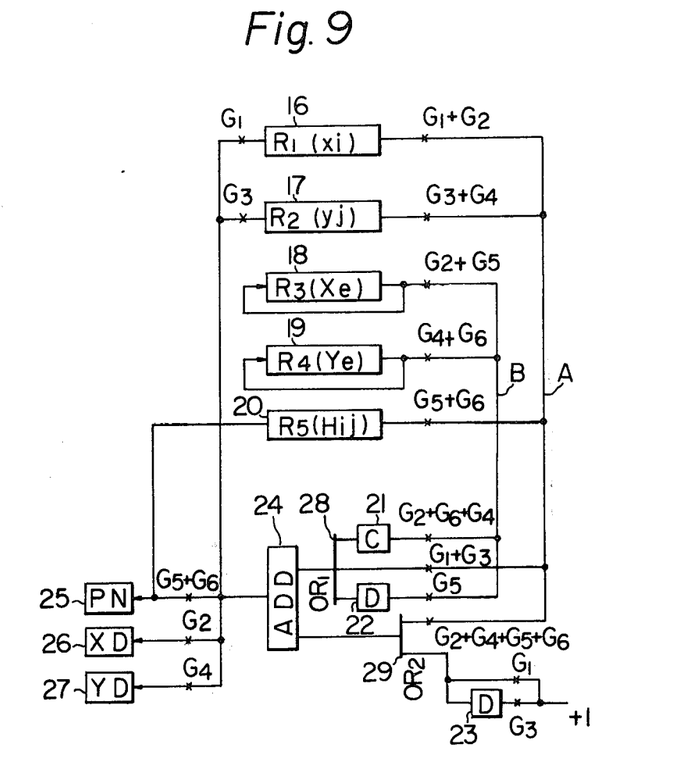
FIG. 9 is a block diagram of the apparatus which realizes the method shown in FIG. 4.

FIG. 9 is one example of the pulse distribution circuit which carried out the algebraic operation of the discrimination equation concerning the linear interpolation. In the circuit of FIG. 9, the ratio between X axis resolution and Y axis resolution is assumed as 1:2. Referring to FIG. 9, blocks 16 through 20 are numerical registers R1-R5 which store the values of the coordinates of the present position $x_i$, $y_j$, the coordinates of the end position $X_e$, $Y_e$ and the value of the discrimination equation $H_{i,j}$, respectively. Block 21 is a complement circuit, 22 and 23 are one bit delay circuits which double an input numerical value, 24 is an adder, 25 is a flip-flop which stores information as to whether the polarity of the discrimination equation $H_{i,j}$ is positive or negative, 26 is a flip-flop which stores information as to whether the polarity of the values $x_i - X_e$ is positive or negative, 27 is a flip-flop which stores information as to whether the polarity of the values $y_j - Y_e$ is positive or negative, 28 and 29 are OR gates, $G_1$ through $G_6$ are gate control signals which close and open the circuit, and lines A and B are signal buses. That is, if gate signal $G_1$ is logical "1", the content of the register 16 is sent out to the bus A and this content is provided to the adder 24 via OR gate 28. The binary digit of the command data ($X_e$, $Y_e$) which is sent from a tape reader (not shown in the drawing) is stored in the numerical registers 18, 19 respectively. At this time, the registers 16, 17 and 20 have a zero value. Thereafter, the pulses are distributed in the following sequence.

1. The value of $x_i - X_e$ is algebraically calculated and information as to whether said value is positive or negative is stored in the flip-flop 26. (The gate signal $G_2$ is logical "1").

2. When the above-mentioned value is negative, one pulse is sent out to the X axis driver.

3. The algebraic operation $(R_1) + 1 \rightarrow R_1$, that is, $x_{i+1} = x_1 + 1$ is carried out. (The gate signal G is logical "1".)

4. The algebraic operation $(R_5) - (R_4) \rightarrow R_5$, that is, $H_{i+1,j} = H_i, j - Y_e$ is carried out, and information as to whether the result of this operation is positive or negative is stored the flip-flop 25. (The gate signal G6 is logical "1").

5. If $H_{i+1,j} \leq 0$, the operation is transferred to sequence step (1), and if $H_{i+1,j} < 0$, the operation is transferred to the following sequence step (6).

6. The value of $(R_2)-(R_4)$, that is, $Y_j-Y_e$, is algebraically calculated, and information as to whether said value is positive or negative is stored into the flip-flop 27. (The gate signal $G_4$ is logical "1".)

7. When the above-mentioned value is negative, one pulse is sent out to the Y axis driver.

8. The operation $(R_2) + 2 \rightarrow R_2$, that is, $Y_{j+1} = Y_j + 2$ is carried out. (The gate signal $G_3$ is logical "1".)

9. The operation $(R_5) + 2.(R_3) \rightarrow R_3$, that is, $H_{i, j+1} = H_{i,j} + 2X_e$ is carried out, and information as to whether the result of above operation is positive or negative is stored the flip-flop 25. (The gate signal $G_5$ is logical "1".)

10. If $H_{i+1,j} \geq 0$, the operation is transferred to sequence step (1) and, if $H_{i+1,j} < 0$, the operation is transferred to sequence step (6).

The above-mentioned operational sequence is continued until $x_i$ reaches $X_e$ and $Y_j$ reaches $Y_e$, where the pulse distribution sequence is finished.

Figure 10:
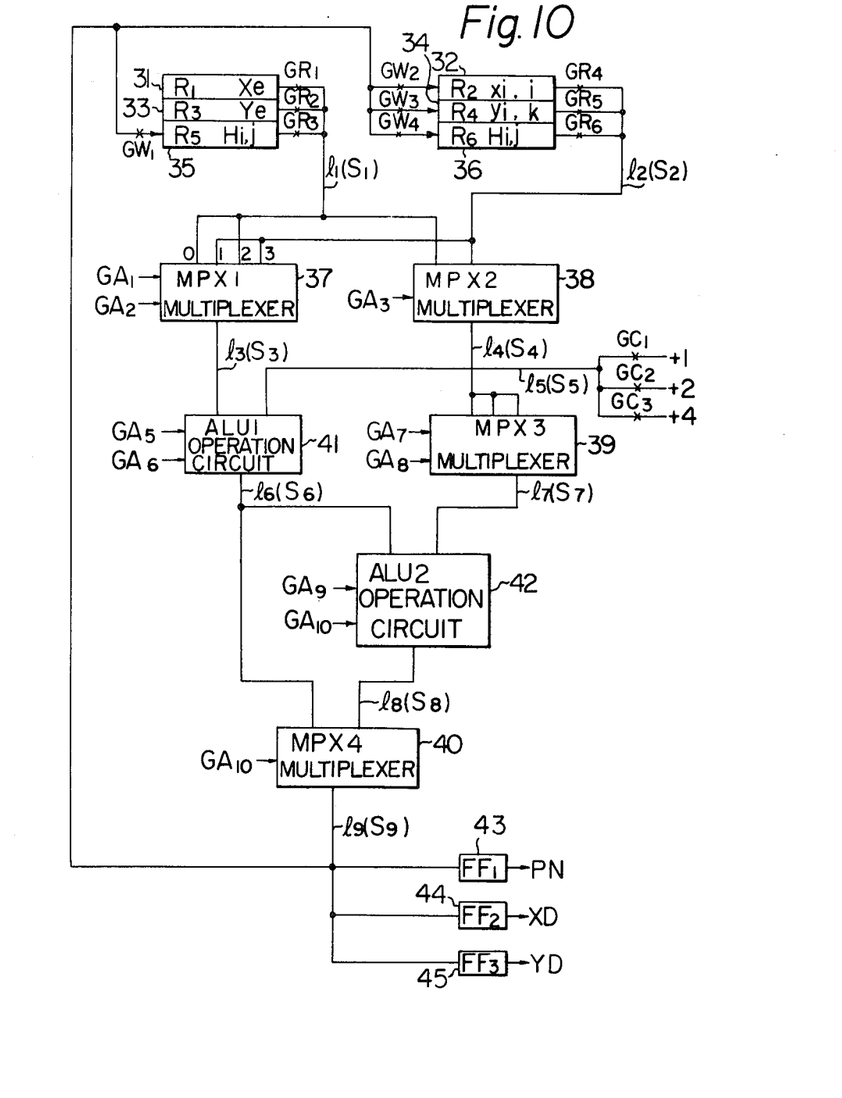
FIG. 10 is a block diagram of the apparatus which realizes the method shown in FIGS. 4 and 7.

FIG. 10 is another example of the pulse distribution circuit which carries out the algebraic operation of the discrimination equation concerning the pulse distribution along a linear line as well as a circular form. In the circuit in FIG. 10, the ratio between X axis resolution and Y axis resolution is assumed as 1:2. Referring to FIG. 10, blocks 31 and 33 are registers which store the values of the $X_e$ and $Y_e$ of the end point, 32 and 34 are registers which store the values of the $x_i$ and $y_j$ of the present distributing point, 35 is a register which stores the discrimination equation $H_{i,j}$ of the circular interpolation and 36 is a register which stores the discrimination equation $H_{i,j}$ of the linear interpolation. Reference numerals 37 - 40 are multiplexers and 41, 42 are operation circuits.

The multiplexers 37 and 39 are the integrated circuits LA 26, which are manufactured by Fujitsu Company Ltd, the multiplexers 38 and 40 are integrated circuits 9322, which are manufactured by Fairchild, and the operation circuits 41 and 42 are integrated circuits 9341, which are manufactured by Fairchild.

The multiplexer 37 are controlled by gate signals GA1 and GA2. When said gate signals GA1 and GA2 are respectively "0", a signal $S_1$ on a signal line $l_1$ is passed to a signal line $l_3$. When the signal GA1 is "1" and the signal GA2 is "0", a signal $S_2$ on a signal line $l_2$ is passed to the signal line $l_3$. When the signal GA1 is "0" and the signal GA2 is "1", the signal $S_1$ is doubled and is supplied to the signal line $l_3$. When the signals GA1 and GA2 are respectively, "1" the signal $S_2$ is doubled and supplied to the signal line $l_3$.

The multiplexer 38 is controlled by a gate signal GA3. When said signal GA3 is "0", the signal $S_1$, which appears on the signal line $l_1$, is supplied to a signal line $l_4$. When the signal GA3 is "1", the signal $S_2$, which appears on the signal line $l_2$, is supplied to the signal line $l_4$.

The multiplexer 39 is controlled by gate signals GA7 and GA8. When said gate signal GA7 and GA8 are respectively "0", a signal $S_4$ on a signal line $l_4$ is passed to a signal line $l_7$. When the signal GA7 is "1" and the signal GA8 is "0", the signal $S_4$ on a signal line $l_4$ is doubled and is supplied to the signal line $l_7$. When the signal GA7 is "0" and the signal GA8 is "1" the signal $S_4$ is multiplied by four times and supplied to the signal line $l_7$.

The multiplexer 40 is controlled by a gate signal GA10, and the function of said multiplexer 40 is the same as that of the multiplexer 38.

The operation circuit 41 is controlled by gate signals GA5 and GA6. When the gate signals GA5 and GA6 are both "0", the operation $S_3 + S_5$ is carried out with respect to the signal $S_3$ and $S_5$, which appear on the signal lines $l_3$ and $l_5$, respectively, and the result of said operation is supplied to a signal line $l_6$. When the signal GA5 is "1" and the signal GA6 is "0", the operation $S_3 - S_5$ is carried out, and when the signal GA6 is "1", the output of said operation circuit 41 is "0", regardless of the value of the gate signal GA5.

The operation circuit 42 is controlled by gate signals GA9 and GA10. When the gate signal GA9 is "0" and the signal GA10 is "1", the operation $S_6 + S_7$ is carried out with respect to the signal $S_6$ and $S_7$, which appear on the signal lines $l_6$ and $l_7$, respectively, and the result of said operation is supplied to a signal line $l_8$. When the signal GA9 is "1" and the signal GA10 is "1", the operation $S_6 - S_7$ is carried out.

Gate signals $GW_1 - GW_4$ are write control signals. When the gate signal $GW_1$ is "1", a signal $S_9$, which appears on a signal line $l_9$ is stored in the register 35. When the gate signal GW2 is "1", a signal $S_9$, which appears on the signal line $l_9$, is stored in the register 32. When the gate signal GW3 is "1", a signal $S_9$, which appears on a signal line $l_9$, is stored in the register 34. When the gate signal GW4 is "1", a signal $S_9$, which appears on the signal line $l_9$, is stored in the register 36.

Gate signals GR1 - GR6 are read control signals. The contents of the registers 31 - 36 are supplied to the signal line $l_1$ or $l_2$ when the logic of said read control signal is "1". signals and input signal "+1", "+2" or "+4" is supplied to a signal line $l_5$ via an OR circuit when one of the gate signals GC1-GC3 is logic "1", respectively. The reference numeral 43 is a flip-flop which stores information as to whether the polarity of the discrimination equation $H_{ij}$ is positive or negative; 44 is a flip-flop which stores information as to whether the polarity of the value $x_i - X_e$ is positive or negative, and; 45 is a flip-flop which stores information as to whether the polarity of the value $y_j - Y_e$ is positive or negative.

Next, the function of the circuit shown in FIG. 10 will be explained.

($\alpha$) When the pulse is distributed along the straight line as shown in FIG. 4, firstly, command data, which are the numerical values, and the signs of the end point $X_e$, $Y_e$, are supplied from a tape reader, not shown in the drawing, to the registers 31 and 33 where said values are stored. Then, the contents of the registers 32, 34, 35 and 36 and flip-flops 43 - 45 are reset to "0". We designate the output of the flip-flops 43, 44 and 45 as PN, XD and YD, respectively.

i. The logical value of XD·YD is discriminated. When said value is "1", the pulse distribution is finished.

ii. If PN="0", the operation $[R_6] - [R_3] \rightarrow [R_6]$, that is, $H_{ij} - Y_e \rightarrow H_{i+1,j}$ is carried out. (GR2, GR6, GA1, GA10, GA9, GW4 are "1".) If PN="1", the operation jumps to sequence step (vi).

iii. When the result of the above operation is of a negative polarity, the flip-flop 43 is set to "1". (PN="1").

iv. The operation $[R_2] + (1) \rightarrow [R_2]$, that is, the operation $X_i + 1 \rightarrow X_{i+1}$ is carried out. (Gates GR4, GA1, GC1 and GW2 are "1".)

v. The algebraic operation $[R_2] - [R_1]$, that is, $x_i - X_e$ is carried out. When the result of said operation is zero or negative, the flip-flop 44 is set to "1" (XD="1") and one pulse is sent to the X axis driver. (Gates GR1, GR4, GA1, GA9, GA10 are "1".)

Next, the operation jumps to sequence step (i).

vi. The algebraic operation $[R_6] + 2[R_1]_o \rightarrow [R_6]$, that is, the operation $H_{ij} + 2 \cdot X_e \rightarrow H_{i,j+1}$ is carried out. When the result of said operation is zero or positive, the flip-flop 43 is reset to "0" (PN="0"). (Gates GR6, GR1, GA1, GA7, GA10 and GW4 are "1".)

vii. The algebraic operation $[R_4] + 2 \rightarrow [R_4]$, that is, the operation $y_j + 2 \rightarrow y_{j+1}$ is carried out. (Gates GR5, GA1, GC2, GW3 are "1".)

viii. The algebraic operation $[R_4] - [R_3]$, that is, $y_j - Y_e$ is carried out. When the result of said operation is zero or negative, the flip-flop 45 is set to "1" (YD="1") and one pulse is sent out to the Y axis driver. (Gates GR2, GR5, GA1, GA9, GA10 are "1").

The operation jumps to the sequence step (i).

($\beta$) When the pulse is distributed along a circular profile, such as shown in FIG. 7, firstly, the coordinates of the end point $(X_e, Y_e)$ and the start point $(i, k)$ are supplied from a tape reader, not shown in the drawing, to the registers 31, 33, 32 and 34 where the value of said coordinates are stored. The contents of the registers 35 and 36 and flip-flops 43 - 45 are reset to "0".

i. The logical value of XD·YD is discriminated. When said value is "1", the pulse distribution is finished.

ii. If PN="1", the operation $[R_5] + 2[R_2] + 1 \rightarrow [R_5]$, that is, $H_{ij} + 2X_i + 1 \rightarrow H_{i+1,j}$ is carried out. (GR3, GC1, GR4, GA3, GA7, GA10, GW1 are "1".) If PN="0", the operation jumps to sequence step (vii).

iii. When the result of the above operation is zero or positive, the flip-flop 43 is reset to "0" (PN="0").

iv. The operation $[R_2] + 1 \rightarrow [R_2]$, that is, the operation $X_i + 1 \rightarrow X_{i+1}$ is carried out. (Gates GR4, GA1, GC1 and GW2 are "1".)

v. The algebraic operation $[R_2] - [R_1]$, that is, $x_i - X_e$ is carried out. When the result of said operation is zero or negative, the flip-flop 44 is set to "1" (XD="1") and one pulse is sent to the X axis driver. (Gates GR1, GR4, GA1, GA9, GA10 are "1".)

Next, the operation jumps to sequence step (i).

vi. The algebraic operation $[R_5] - 4[R_4] + 1 \rightarrow [R_5]$, that is, the operation $H_{ij} - 4Y_j + 4 \rightarrow H_{i,j+1}$ is carried out. When the result of said operation is negative, the flip-flop 43 is set to "1" (PN="1"). (Gates GR3, GR5, GC3, GA3, GC1, GA8, GA9, GA10 and GW1 are "1".)

vii. The algebraic operation $[R_4]-2\rightarrow[R_4]$, that is, the operation $y_j-2\rightarrow Y_{j+1}$, is carried out. (Gates GR5, GA1, GC2, GA5 and GW3 are "1".)

viii. The algebraic operation $[R_4]-[R_3]$, that is, $Y_j - Y_e$ is carried out. When the result of said operation is zero or negative, the flip-flop 45 is set to "1" (YD="1") and one pulse is sent out to the Y axis driver. (Gates GR2, GR5, GA1, GA9, GA10 are "1".)

The operation jumps to sequence step (i).

From the above-mentioned explanation, it will be clear that the output pulse demultiplier circuit 8, shown in FIG. 2, can be removed. Further, when the operation equation is modified by taking into consideration the weight of the input resolution, the input data converter circuit 5, shown in FIG. 2, can be also removed.

As mentioned above, according to the present invention, when the resolutions of different control axes are different, the different resolutions can be treated by modifying the discrimination equation, and the output pulse demultiplier circuit and the input data converter circuit (which are conventionally used) can be removed. In addition, the construction of the apparatus become very simple and the pulse distribution can be easily realized.

What is claimed is:

1. A pulse distribution method for a numerically controlled machine tool having two control axes which include a first control axis having a smaller resolution and a second control axis having a larger resolution by a given ratio, wherein said method comprises transmitting one pulse of said machine tool for moving said machine tool in a direction along said first and second control axis, respectively, in accordance with whether a distributing point of the pulse distributing operation is above or below a locus to be followed, and by a given amount so as to establish a new distributing point which differs from said distributing point by said given amount, and then, determining whether the next one pulse is to be supplied to said first or second control axis in accordance with whether said new distributing point is above or below said locus said method further comprising:

defining said locus to be followed by means of a corresponding, related discrimination function;

computing a value of said discrimination function so as to derive a polarity thereof;

transmitting said one pulse for first or second control axis movement of said tool in accordance with said sign of said computed value being positive or negative, respectively;

shifting said distributing point in the first control axis direction by the smaller resolution when said one pulse is transmitted for said first control axis movement; and when said one pulse is supplied to said second control shifting said distributing point in the second control axis direction by said larger resolution when said one pulse is transmitted for said second control axis movement.

2. In the method of claim 1 wherein the locus to be followed is a linear locus, said discrimination function being as follows:

$$H_{ij} = X_e Y_i - Y_e x_i$$

where $H_{ij}$ is the discrimination function, $(X_e Y_e)$ is an end point $P_e$ of the locus, and $(x_i, y_i)$ is said distributing point P.

3. The method of claim 1 including the additional step of designating said end point, and wherein said method steps are repeated in sequence until said new distributing point coincides with said end point.

4. The method of claim 1 wherein said locus to be followed is circular, said discrimination function being as follows:

$$H_{ibj} = x_i^2 + Y_i^2 - R^2$$

where $H_{ibj}$ is the discrimination function, $(x_i,y_i)$ is the distributing point P, and $R$ is the radius of the circular locus to be followed.

5. The method of claim 1 including the additional step of designating an end point for the locus to be followed, and wherein said method steps are repeated until said new distributing point coincides with said end point.

6. A method of distributing command pulses supplied to a machine tool having two control axes, a first of said control axes having a smaller resolution than does a second of said control axes by a given ratio, so as to cause said machine tool to perform a machine operation along an operational locus defined by successive points, a current point of which has coordinate values which either are coincident with, or deviate on either of two sides of, a predetermined locus, comprising the steps of:

a. defining said predetermined locus by a corresponding, related discrimination function which, in accordance with said coordinate values of said current point, yield a value having a polarity which indicates whether said current point is coincident with said predetermined locus and, if not, on which side of said predetermined locus said current point is deviating from said predetermined locus;

b. determining, in accordance with said value of said discrimination function and said polarity thereof, whether said current point is coincident with said predetermined locus and, if not, on which side of said predetermined locus said current point is located;

c. shifting said current point in the direction of said first and second control axis, dependent on the polarity of said value to said discrimination function, by an amount proportional to said given ratio to define a new current point; and d. issuing a command pulse to said machine tool to perform said machine operation along one of said first or second control axis, dependent on the polarity of said value of said discrimination function.

7. The method of claim 6 wherein the predetermined locus is a linear locus, said discrimination function being as follows:

$$H_{ij} = X_e Y_i - Y_e x_i$$

where $H_{ij}$ is the discrimination function, $(X_e Y_e)$ is an end point $P_e$ of the locus, and $(x_i, y_i)$ is said distributing point P.

8. The method of claim 7 including the additional step of updating the polarity of said value of said discrimination function by performance of the following calculation with respect to one of said control axes:

$$H_{i+1,j} = H_{i,j} - mY_e$$

said method further comprising the additional step of updating the polarity of said value of said discrimination function by performing the following calculation with respect to the other of said control axes:

$$H_{i,j+l} = H_{ij} + n \cdot X_e$$

where $m : n$ is the ratio of resolutions for said axes.

9. The method of claim 6 including the additional step of designating an end point, and wherein said method steps are repeated in sequence until said new distributing point coincides with said end point.

10. The method of claim 6 wherein said predetermined locus is circular, said discrimination function being as follows:

$$H_{ij} = x_i^2 + y_j^2 - R^2$$

where $H_{ij}$ is the discrimination function, $(x_i, Y_j)$ is the distributing point P, and R is the radius of the circular locus to be followed.

11. The method of claim 10 comprising the additional step of updating the polarity of said value of said discrimination function by performing the following calculation with respect to one of said control axes:

$$H_{i+l,j} = H_{ij} + 2 \cdot m \cdot X_e + m^2$$

said method further comprising the additional step of updating the polarity of said value of said discrimination function by performing the following calculation with respect to the other of said control axes:

$$H_{i,j+l} = H_{ij} - 2 \cdot n \cdot y_j + n^2$$

where $m:n$ is the ratio of resolutions for said axes.

12. The method of claim 6 including the additional step of designating an end point for the predetermined locus, and wherein said method steps are repeated until said new distributing point coincides with said end point.

13. In a system for numerically controlling a machine tool having two control axes which include a first control axis having a smaller resolution and a second control axis having a larger resolution by a given ratio;

an apparatus for distributing command pulses supplied to said machine tool so as to cause said machine tool to perform a machine operation along an operational locus defined by successive points, a current point of which has coordinate values which are coincident with, or deviate on either of two sides of, a predetermined locus, wherein said predetermined locus is defined by a corresponding, related discrimination function which, in accordance with said coordinate values of said current point, yields a value having a polarity which indicates whether said current point is coincident with said predetermined locus and, if not, on which side of said predetermined locus said current point is deviating from said predetermined locus, said apparatus comprising:

means for determining, in accordance with said value of said discrimination function and said polarity thereof, whether said current point is coincident with said predetermined locus and, if not, on which side of said predetermined locus said current point is located;

means for shifting said current point in the direction of said first or second control axis, dependent on the polarity of said value of said discrimination function, by an amount in proportion to said given ratio to define a new current point; and means for issuing a command pulse to said machine tool to perform said machine operation along one of said first or second control axis, dependent on the polarity of said value of said discrimination function.

* * * * *

UNITED STATES PATENT OFFICE
CERTIFICATE OF CORRECTION

Patent No. 4,042,812          Dated August 16, 1977

Inventor(s) Yoshihiro Hashimoto et al

It is certified that error appears in the above-identified patent and that said Letters Patent are hereby corrected as shown below:

Column 1, line 44, change "supplid" to --supplied--.
Column 1, line 49, change "of" to --for--.
Column 2, line 30, change "space" to --speed--.
Column 2, line 32, change "value,," to --value,--.
Column 3, line 2, delete "and".
Column 3, line 53, change "by" to --in--.
Column 3, line 54, change "specifications" to --specification--.
Column 4, line 4, after "nation" insert --equation for algebraically calculating whether the present--.
Column 4, line 6, change "Y" (first occurrence) to --y--.
Column 4, line 9, change "Y" to --y--.
Column 4, line 13, change "Y" (both occurrences) to --y--.
Column 4, line 19, (first and second occurrences) change "Y" to --y--.
Column 4, line 56, change "Y" (both occurrences) to --y--.
Column 4, line 58, change "Y" to --y--.
Column 4, line 60, change "Y" to ----y--.
Column 5, line 1, change "$x_1$" to --$x_i$--.
Column 5, line 4, change "=" (second occurrence) to --+--.
Column 5, line 7, change "$x_1$" to --$x_i$--.
Column 5, line 7, change "$Y_j$" to --$y_j$--.
Column 5, line 26, before "for" insert --b.--.
Column 5, line 28, change "$H_{i+1j},  = H_{ij} + 2 \cdot i m \cdot X_e + m^2$," to --$H_{i+1j}, = H_{ij} + 2 \cdot m \cdot X_e + m^2$,--.
Column 5, line 34, change "$H_{j+1}$" to --$H_{ij+1}$--.
Column 5, line 40, change "$y_{j+1} = y_j + n$" to --$y_{j+1} = y_i - n$--.
Column 5, line 49, change "carried" to --carries--.
Column 5, line 55, change "nates" to --nate--.
Column 6, line 16, change "$x_1 + 1$" to --$x_i + 1$--.
Column 6, line 19, change "$H_{i,j} - Y_e$" to --$H_{i,j} - Y_e$--.
Column 6, line 23, change "$\leqq$" to --$\geqq$--.

UNITED STATES PATENT OFFICE
CERTIFICATE OF CORRECTION

Patent No. 4,042,812                    Dated   August 16, 1977

Inventor(s) Yoshihiro Hashimoto, et al

It is certified that error appears in the above-identified patent and that said Letters Patent are hereby corrected as shown below:

Column 6, line 66, change "are" to --is--.
Column 7, line 56, after ""1"." insert --Gate signals GC1-GC3 are gate control-- (new paragraph).
Column 8, line 52, delete "GC1,".
Column 8, line 53, after "GA3," insert --GC1,--.
Column 9, line 5, change "yj - 2→Yj+1" to --$y_j - 2 \rightarrow y_{j+1}$--.
Column 9, line 35, change "and" to --or--.
Column 9, line 67, change "Hij = X$_e$Yi - Y$_e$xi" to --$H_{ij} = X_e Y_i - Y_e X_i$--.
Column 11, line 19, change "($x_i, Y_j$)" to --$(x_i, Y_j)$--.

Signed and Sealed this

*Third* Day of *January 1978*

[SEAL]

Attest:

RUTH C. MASON            LUTRELLE F. PARKER
*Attesting Officer*      *Acting Commissioner of Patents and Trademarks*